United States Patent
Venkata Subramanian et al.

(10) Patent No.: US 8,185,652 B2
(45) Date of Patent: May 22, 2012

(54) DATA SWITCH AND METHOD OF OPERATING THE DATA SWITCH

(75) Inventors: Ramakrishnan Venkata Subramanian, Singapore (SG); Deepak George, Singapore (SG); Gulam Mohamed, Singapore (SG)

(73) Assignee: Lantiq Deutschland GmbH, Neubiberg (DE)

(*) Notice: Subject to any disclaimer, the term of this patent is extended or adjusted under 35 U.S.C. 154(b) by 676 days.

(21) Appl. No.: 10/535,172

(22) PCT Filed: Nov. 15, 2002

(86) PCT No.: PCT/SG02/00268
§ 371 (c)(1),
(2), (4) Date: May 16, 2005

(87) PCT Pub. No.: WO2004/047375
PCT Pub. Date: Jun. 3, 2004

(65) Prior Publication Data
US 2006/0041683 A1   Feb. 23, 2006

(51) Int. Cl.
*G06F 15/173* (2006.01)
(52) U.S. Cl. .................................................. 709/238
(58) Field of Classification Search .................. 370/349, 370/392, 401, 474; 709/238, 249, 250, 220
See application file for complete search history.

(56) References Cited

U.S. PATENT DOCUMENTS

| | | | |
|---|---|---|---|
| 5,394,402 A * | 2/1995 | Ross | 370/402 |
| 5,590,285 A * | 12/1996 | Krause et al. | 709/218 |
| 5,757,795 A * | 5/1998 | Schnell | 370/392 |
| 6,658,027 B1 * | 12/2003 | Kramer et al. | 370/516 |
| 6,763,023 B1 * | 7/2004 | Gleeson et al. | 370/392 |
| 6,778,542 B1 * | 8/2004 | Hassan-Ali et al. | 370/401 |
| 6,931,018 B1 * | 8/2005 | Fisher | 370/401 |
| 6,934,260 B1 * | 8/2005 | Kanuri | 370/255 |
| 7,065,095 B2 * | 6/2006 | Coden | 370/404 |
| 7,154,899 B2 * | 12/2006 | Khill | 370/401 |
| 2002/0054589 A1 | 5/2002 | Ethridge et al. | |
| 2003/0065944 A1 * | 4/2003 | Mao et al. | 713/201 |
| 2003/0110240 A1 * | 6/2003 | Lockridge et al. | 709/220 |
| 2003/0110344 A1 * | 6/2003 | Szczepanek et al. | 711/100 |
| 2003/0210706 A1 * | 11/2003 | Chang et al. | 370/466 |
| 2005/0080931 A1 * | 4/2005 | Hardy et al. | 709/249 |

FOREIGN PATENT DOCUMENTS

GB    2 359 222 A    8/2001
WO    WO 01/08360 A1    2/2001

* cited by examiner

*Primary Examiner* — Jeffrey Pwu
*Assistant Examiner* — Scott M Sciacca
(74) *Attorney, Agent, or Firm* — SpryIP, LLC

(57) ABSTRACT

A data switch (4) is proposed which can be operated such that it generates a MA table of MAC addresses of devices associated with some of its ports (9, 13, 15, 17, 19), but not the MAC addresses associated with one of the ports (11). Packets received by the switch, other than from the port (11), are assumed to be destined for the port (11) and are transmitted via the port (11). If the port (11) is connected to a network, and all the other ports are connected to a relatively small number of devices, such as one device per port, then the memory requirement to store the MA table is dramatically reduced.

11 Claims, 1 Drawing Sheet

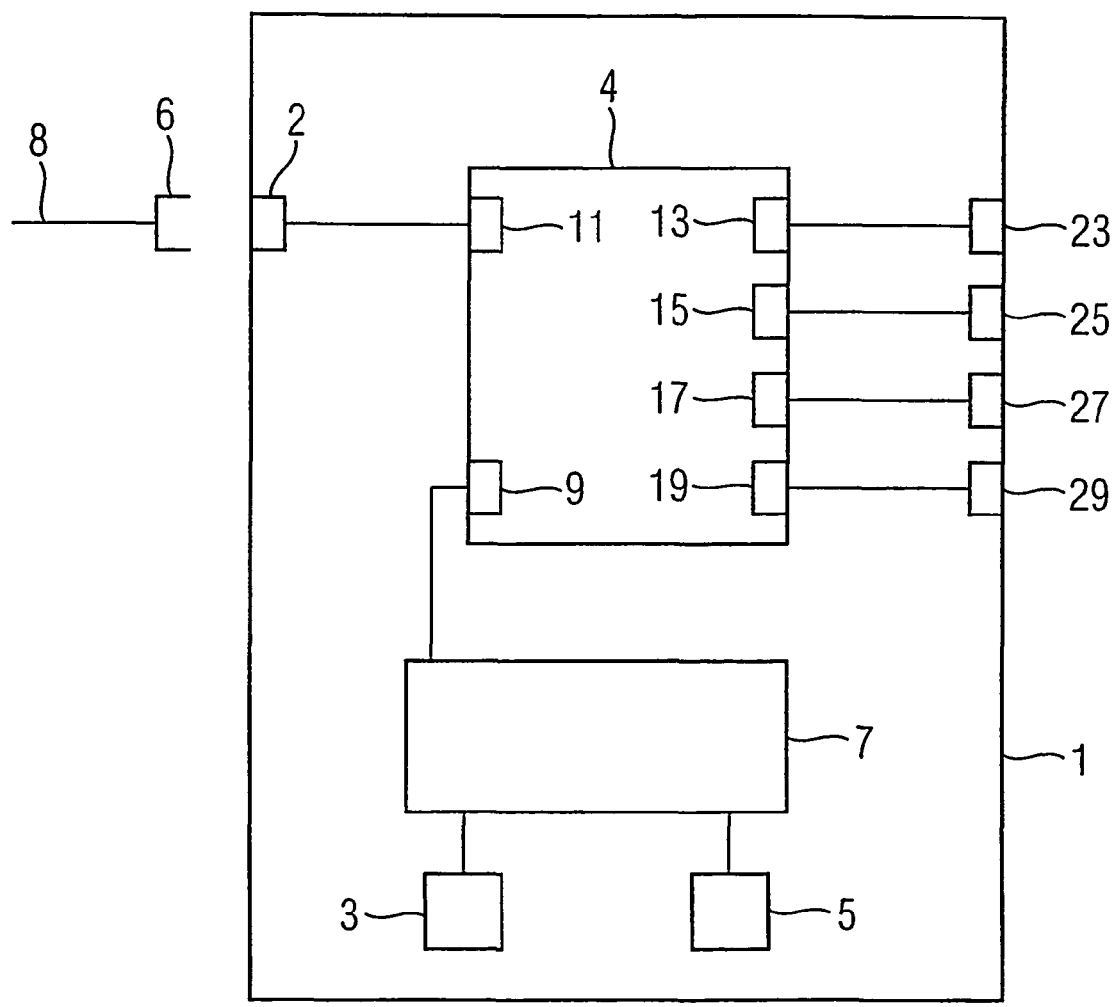

DATA SWITCH AND METHOD OF OPERATING THE DATA SWITCH

FIELD OF THE INVENTION

The present invention relates to a data switch. The switch is particularly suitable for use in Ethernet voice communication devices.

BACKGROUND OF INVENTION

Data switches, such as Ethernet switches, are well known which transfer data packets between ingress/egress ports connected by a switching fabric controlled by a control unit. Two or more of the ports of the switch are connected (either directly or via other devices or networks) to devices having MAC (medium access control) addresses. Each of the data packets contains a destination address specifying the MAC address of the device to which the data packet is directed and an origin address specifying the MAC address of the device where the packet originated.

When the switch is first turned on, it typically does not "know" the MAC addresses of the devices connected to it, and which ports those devices are connected to. Typically, the device learns this information automatically using the data packets it receives, by extracting the origin addresses from the data packets and noting which port the data packet arrived at. The association between these two pieces of information is stored in a MAC address table ("MA table"). A variety of algorithms are known for constructing the table. When a data packet is received containing a destination address, the switch can look up the address in the MA table, find the associated port, and transmit the data packet to that port, for onward transmission to the device having that MAC address.

A significant problem, however, is that if the switch is transmitting data among a very large number of devices, the size of the MA table must become very great. This is especially true because many of the algorithms for generating MA tables are inefficient in terms of the amount of writable memory required in relation to the amount of data which it actually has to store.

SUMMARY OF THE INVENTION

The present invention aims to provide a new and useful data switch, and in particular one with a lower memory requirement.

In general terms, the invention proposes that the MA table is not constructed for MAC addresses associated with at least one of the ports of the switch, called here a "first port" of the switch. When the switch identifies that a certain MAC address is associated with this first port, it does not insert this information into the MA table.

The invention is particularly applicable to switches which are intended to be used with a single one of the ports connected directly to a communications network, such as a LAN, and with the other ports connected directly to devices (or unused). In such circumstances, the first port is preferably the one connected to the LAN, so that the data switch may learn the MAC addresses associated with the devices, but not the MAC addresses associated with the port which is connected to the network. This means that the device will be capable of correctly transferring data packets to the ports connected to the devices.

When an packet which is received from a port other than the first port, and the destination address is not one of the learnt MA addresses, the switch may assume that the destination address is one of the (unlearnt) MAC addresses associated with the first port, and so transmit the packet to the first port for transmission to the network. This concept provides an alternative expression of the invention.

The first port of the switch may be predetermined (e.g. a port which is intended always to be the one connected to a LAN). Alternatively, the first port may be determined by a control signal applied from outside the switch, or automatically, e.g. based on an automatic determination of which data port receives the greatest number of new packets, or which data port is associated with the greatest number of MAC addresses.

Preferably, the switch is provided with a first control register for storing a control bit, and the switch is arranged, based on the value of the control bit, to either learn MA addresses selectively according to the invention, or according to conventional learning mechanisms (i.e. with MAC addresses for all ports being learnt). This control bit may be set by a control signal from outside the switch, and this allows the switch of the invention to be operated as a conventional switch when desired.

In a preferred embodiment, the switch is arranged to have at least one port for receiving/transmitting voice signals, i.e. data packets containing voice data collected by a microphone and a destination address indicating where the data packets are to be sent.

For example, it is known to provide a voice communication device for supporting communication with a second device. The communication device includes a microphone, a speaker, circuitry for transforming sound signals received from the microphone into data packets and for transforming data packets into control signals for the speaker, and a data switch having a port connected to the circuitry. The data switch is connected to the second device via a network such as a LAN network. Typically, the data switch includes one or more further ports for connection to other devices, such as personal computers. Such a system may be implemented using a switch according to the invention. In this case, the first port of the switch is preferably the one connected to the network.

In this embodiment, the switch will typically have a small number of other ports, e.g. no more than 5, no more than 10 or no-more than 15, and these other ports will be associated with a relatively low number of MAC addresses, typically no more than one or two. Thus, the maximum size of the MA table required to learn the MAC addresses associated with all the ports apart from the first port will typically only have to be enough to learn no more than 5 to 30 data items.

BRIEF DESCRIPTION OF THE FIGURES

Preferred features of the invention will now be described, for the sake of illustration only, with reference to the following FIGURES in which:

FIG. 1 is a schematic illustration of an embodiment of the invention.

DETAILED DESCRIPTION OF THE EMBODIMENTS

Referring to FIG. 1, the embodiment illustrated is a voice communication device 1 including a microphone 3 and a speaker 5. The voice communication device 1 includes a socket 2 by which the voice communication device 1 can be connected to a LAN (not shown) by means of a plug 6 attached to a cable 8 leading to the LAN. The LAN includes a number of devices, each having a respective MAC address. At least one of these devices is another voice communication device, and the voice communication device 1 is for communication with a selected one or more of these other voice communication devices.

The microphone 3 and speaker 5 are connected to circuitry 7 which converts sound signals captured by the microphone 3 into data packets including the destination address of the other voice communication device(s) with which the voice communication device 1 is in communication. The circuitry 7 is also adapted to convert data packets originating in the other voice communication device(s) into signals for transmission to the speaker 5 for conversion into sound signals.

The voice communication device includes a data switch 4, having ports 9, 11, 13, 15, 17, 19. Each of these is an ingress/egress port. The port 9 is connected to the circuitry 7, and the port 11 is connected to the socket 2 for connection to the LAN network. The ports 13, 15, 17, 19 are connected to respective sockets 23, 25, 27, 29, to which other devices, such as personal computers may be connected. Although four such sockets are shown, the number of sockets is not limited in this respect.

The switch 4 includes a switching fabric (not shown, but of a conventional design), and a control unit (not shown) for controlling the switching fabric. The control unit includes a first control register (not shown) which stores a value which can be set by the user of the voice communication device 1. In a first setting the control unit of the switch 4 uses a conventional learning algorithm to learn the MAC addresses of all devices which are connected to the switch 4 (including those devices which are connected to the switch 4 via the LAN and the port 11), and the association between those addresses and the ports 9, 11, 14, 15, 17, 19.

In a second setting of the first control register, however, the learning algorithm is different in that switch 4 does not store the MAC addresses of the devices connected to the switch 4 via the port 11. In other words, the port 11 is a "first port" as defined above. It continues, however, to learn the addresses of the devices connected to the other ports 9, 13, 15, 17, 19 (note however that since the port 9 is always connected to the same circuitry 7, it may not be necessary to learn the MAC address associated with this port; in other words, this MAC address may be preprogrammed).

Generally, a small number of devices will be attached to the switch 4 using the ports 13, 15, 17, 19 (e.g. typically one device per port), so the maximum number of data items (i.e. MAC addresses and their associations with ports) which the switch 4 is required to learn is typically not more than about 5, not more than about 10, or not more than about 15.

The data switch may control a second control register (e.g. set by an external signal), which determines whether the state operates in a "learning state" or a "normal state".

In the learning phase, the learning of this data is via conventional learning techniques (as sketched above) based on the origin address of data packets received through the ports. For example, when a data packet is received from any of the ports having a destination address which is not associated in the address table with any of the ports, that data packet is transmitted to all the (other) ports 9, 11, 13, 15, 17, 19.

However, once it is determined that the addresses of all the devices connected the ports 9, 13, 15, 17, 19 have been inserted into the address table, the second control register is reset to indicate that the switch should operate in the normal mode, and the operation of the switch 4 is as follows.

If the switch receives a data packet from any of the ports 9, 11, 13, 15, 17, 19 having a destination address which corresponds (according to the MA table) to one of the ports 9, 13, 15, 17, 19, then the switch transmits the data packets to that switch. In this way the switch makes possible communication between the circuitry 7 and the devices attached to the sockets 23, 25, 27, 29, and allows for incoming data packets from the LAN to be directed to the circuitry 7 or the correct one of the devices attached to the sockets 23, 25, 27, 29.

If a data packet is received from the port 11 which does not have a destination address associated (according to the MA table) with any of the ports 9, 13, 15, 17, 19, then the packet is discarded.

If, a data packet is received from any of the ports 9, 13, 15, 17, 19 which does not have a destination address associated (according to the MA table) with any of the ports 9, 13, 15, 17, 19, then the packet is transmitted only to the port 11, which transmits it in turn to the LAN. It is then the job of the LAN to ensure that the packet reaches the device associated with the packet's destination address.

Thus, in comparison to the first setting of the first control register (and in comparison to the known systems), the second setting of the first control register permits the memory usage of the switch to be very much reduced, while maintaining the same performance level.

Note that the first control register may be identical to the second control register. In other words, it may be the same control bit which in a first setting indicates that the switch should operate as in the prior art, and in a second setting indicates that learning has been completed and that the switch should (i) no longer learn addresses associated with the port 11, and (ii) should discard all packets received from the port 11 which are not recognised by the table.

Note that in this case, by the time the control bit is changed over at the end of the learning phase, the address table may have already learnt some MAC addresses associated with the port 11. In this case, during the normal phase, data packets received from the ports 9, 13, 15, 17, 19 carrying a destination address associated by the address table with the port 11 are forwarded to the port 11, just as they would be if their destination addresses were not recognised at all by the address table.

Although only a single embodiment of the invention has been described, many variations are possible within the scope of the invention as will be clear to a skilled reader. In particular, although the switch is shown in use in a voice communication device, other applications of the switch are possible, particularly in cases when the switch is connected to a network via a single one of its ports and through each of its other ports to a small number of devices, such as exactly one other device, no more than 2 devices, or no more than 3 devices.

The invention claimed is:

1. A data switch comprising:
a plurality of ingress/egress ports for transmitting data packets including a MAC destination address and a MAC origin address, the plurality of ingress/egress ports including a first ingress/egress port and a plurality of other ingress/egress ports; and
address table construction means for generating a table containing associations between the ingress/egress ports of the switch and MAC addresses of any devices connected to the switch via those ingress/egress ports,
wherein the address table construction means is switchable between a first operating state and a second operating state, the address table construction means being operable to:
insert said associations into said table for each of the first and the plurality of other ingress/egress ports when in the first operating state,
stop generation of the table with respect to the first ingress/egress port before MAC addresses of at least some devices operably coupled through the first ingress/ egress port are associated with the first ingress/egress port in the table when in the second operating state;
a switching fabric; and
a control unit operable to control the switching fabric, the control unit being arranged, upon receiving a data packet from any of the other ingress/egress ports having a destination address which is not stored in the table, to control the switching fabric to transmit the data packet to the first ingress/egress port.

2. A data switch according to claim 1 in which the address table construction means is switched between the first and the second operating state according to a setting of a control register.

3. The device according to claim 1, wherein the first ingress/egress port is adapted to be connected to a communication network.

4. The device according to claim 1, wherein at least one of the other ingress/egress ports is arranged to receive and transmit voice signals.

5. The device according to claim 4, further comprising a microphone, a speaker, circuitry configured to transform sound signals received from the microphone into data packets and to transform data packets into control signals for the speaker, and wherein the circuitry is coupled to the at least one of the other ingress/egress ports arranged to receive and transmit voice signals.

6. The device according to claim 5, further including sockets adapted to connect one or more of the other ingress/egress ports to devices which each have a MAC address.

7. A method of operating a data switch comprising a first ingress/egress port and a plurality of other ingress/egress ports, the method including:
generating a table containing associations between the first and the plurality of other ingress/egress ports of the switch and MAC addresses of any devices connected to the switch thereby when the data switch is in a first operating state;
switching the data switch to a second operating state;
stopping generation of the table with respect to the first ingress/egress port before MAC addresses of at least some devices operably coupled through the first ingress/egress port are associated with the first ingress/egress port in the table
wherein stopping generation of the table occurs after at least one MAC address of at least one device operably coupled through the first ingress/egress port is associated with the first ingress/egress port in the table;
discarding a data packet received from the first ingress/egress port that does not have a destination address associated according to the table with any of the other ingress/egress ports;
receiving, from one of the plurality of other ingress/egress ports, a data packet having a destination port MAC address absent from the generated table; and
forwarding the data packet to the first ingress/egress port.

8. The method of claim 7, wherein forwarding the data packet further comprising forwarding the data packet only if the data packet was received from one of the plurality of other ingress/egress ports.

9. The method of claim 7, further comprising:
converting analog audio signals to data packets; and
providing the data packets to one of the other ingress/egress ports.

10. A method of operating a data switch for switching data packets including a destination address, the data switch comprising a plurality of ingress/egress ports, the method comprising:
generating a table containing associations between ports of the switch and MAC addresses of any devices connected to the switch via those ports,
inserting associations into the table for each of the ingress/egress ports of the switch in a first operating state;
stopping generation of the table with respect to a first ingress/egress port before MAC addresses of at least some devices operably coupled through the first ingress/egress port are associated with the first ingress/egress port in the table in a second operating state,
wherein the plurality of ingress/egress ports includes a plurality of other ingress/egress ports, and
wherein the data switch further comprises a memory storing a table containing associations between the other ingress/egress ports and MAC addresses of any devices connected to the switch via the other ingress/egress ports;
receiving a data packet from any of the other ingress output ports; and
transmitting the data packet to the first ingress/egress port if the data packet contains a destination address that is absent from the table.

11. The method of claim 10, further comprising:
transmitting the data packet to a corresponding ingress/output port if the data packet contains a destination address that is present on the table.

* * * * *